United States Patent
Ishikawa et al.

(10) Patent No.: US 6,222,594 B1
(45) Date of Patent: *Apr. 24, 2001

(54) RUNNER APPARATUS FOR AN INJECTION MOLDING PROCESS AND METHOD THEREFOR

(75) Inventors: Takayasu Ishikawa, Harrison City, PA (US); Seijiro Kobayashi, Irvine, CA (US); Roger Gordon Corn, Monroeville; Jeffrey Warren Higgs, Bethel Park, both of PA (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,600

(22) Filed: Jun. 30, 1998

(51) Int. Cl.$^7$ .................................................... H04N 5/64
(52) U.S. Cl. ........................ 348/836; 312/7.2; 264/328.1
(58) Field of Search ..................................... 348/636, 787, 348/789, 843; 312/7.2, 224; 264/328.1, 328.12, 328.9

(56) References Cited

U.S. PATENT DOCUMENTS

| | | | |
|---|---|---|---|
| 4,965,028 | | 10/1990 | Maus et al. . |
| 5,094,513 | * | 3/1992 | Fukuda ............................ 348/836 X |
| 5,402,263 | * | 3/1995 | Kita et al. . |
| 5,580,146 | * | 12/1996 | Maslow . |
| 5,629,745 | * | 5/1997 | Naito et al. ........................... 348/836 |
| 5,656,307 | * | 8/1997 | Naito et al. .................. 264/328.8 X |
| 5,663,774 | * | 9/1997 | Baik ................................ 348/836 X |
| 5,669,681 | * | 9/1997 | Ishikawa et al. ..................... 312/7.2 |
| 5,719,548 | * | 2/1998 | Stirling et al. .................. 348/836 X |
| 5,730,512 | * | 3/1998 | Heirich ................................. 312/7.2 |
| 5,786,933 | * | 7/1998 | Iwai et al. ....................... 348/836 X |
| 5,806,970 | * | 9/1998 | Giorgianni et al. ............. 348/836 X |
| 6,039,912 | * | 3/2000 | Ohira et al. ...................... 264/328.1 |

* cited by examiner

Primary Examiner—Peter M. Cuomo
Assistant Examiner—Hanh V. Tran
(74) Attorney, Agent, or Firm—Karin L. Williams, Esq.; Mayer, Fortkort, & Williams

(57) ABSTRACT

An apparatus and method of forming a part by injection molding. The method includes the step of providing injection molding equipment having a sprue for supplying melted plastic. In addition, the method includes the step of providing a mold for forming the part, wherein the mold is adapted for forming a runner integrally with the part and wherein the mold is connected to the sprue. Further, the method includes the step of injecting the melted plastic into the mold so as to form the part and the runner such that the runner is integrally formed with the part.

6 Claims, 3 Drawing Sheets

RUNNER APPARATUS FOR AN INJECTION MOLDING PROCESS AND METHOD THEREFOR

FIELD OF THE INVENTION

This invention relates to injection molding processes, and more particularly, to a runner apparatus which is incorporated into a part molded by an injection molding process.

BACKGROUND OF THE INVENTION

Materials such as plastics are frequently molded into desired shapes through the use of injection molding equipment having an injection unit and a clamping unit. In a conventional injection molding process, a pellet or powder resin is melted within a heating chamber of the injection unit. The injection unit further includes a hydraulic piston or ram which pushes the melted plastic past a "torpedo" or spreader that spreads the melted plastic. This enables improved thermal contact with the heating chamber and thus improves the flow of the melted plastic. The melted plastic then converges at a nozzle which is connected to a sprue located within the mold. The sprue is connected to a gate by a runner that is formed in the mold through which the melted plastic flows. The gate serves to direct the flow of melted plastic into a mold cavity to thus form a desired part. Additionally, the gate limits backflow of the melted plastic. Further, the clamping unit provides a clamping force to hold the mold together during the injection molding process. In a mold type known as a cold runner mold, the melted plastic left in the runner is allowed to cool and solidify. This material is then later separated from the part and may be recycled for later use.

Projection televisions, such as rear projection televisions, typically include relatively large and/or asymmetric parts which are fabricated using injection molding techniques. Referring to FIG. 1, a front portion 12 and a rear mirror cover 14 of a rear projection television 10 fabricated by an injection molding process are shown. It is noted that the front portion 12 may be either a cabinet or a beznet. A mirror 16 is used in such televisions for reflecting an image onto a screen. The mirror 16 includes a first reflection surface 18 and a mounting surface 20. The mirror cover 14 includes an inner surface 22 having first 24, second 26, third 28 and fourth 30 mirror mounting areas which may include either mounting blocks or bosses. The mounting areas 24,26,28,30 are positioned in an upper area of the inner surface 22. In use, the mounting surface 20 is positioned upon the mounting areas 24,26,28,30. Upper 32 and lower 34 mirror holders are then used to affix upper and lower horizontal portions, respectively, of the mirror 16 to the mounting areas 24,26,28,30.

It is desirable that the parts formed by the injection molding process are uniformly and consistently molded. However, this is difficult to achieve due to the uneven filling of polymer within the mold, especially in relatively large and/or asymmetric parts. Several methods have been utilized to increase the flow of melted plastic so as improve part uniformity and consistency. In one method, higher injection pressures and/or clamping forces are used in order to improve polymer homogeneity. However, this necessitates the use of larger capacity injection molding equipment which increases costs. Other techniques include the use of a hot runner system having heated runners and molds having multiple polymer entrance points. However, these techniques also increase costs since molds incorporating these features are substantially more complicated to fabricate.

SUMMARY OF THE INVENTION

A method of forming a part by injection molding is disclosed. The method includes the step of providing injection molding equipment having a sprue for supplying melted plastic. In addition, the method includes the step of providing a mold for forming the part, wherein the mold is adapted for forming a runner integrally with the part and wherein the mold is connected to the sprue. Further, the method includes the step of injecting the melted plastic into the mold so as to form the part and the runner such that the runner is integrally formed with the part.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

DETAILED DESCRIPTION OF THE INVENTION

Figure 1:
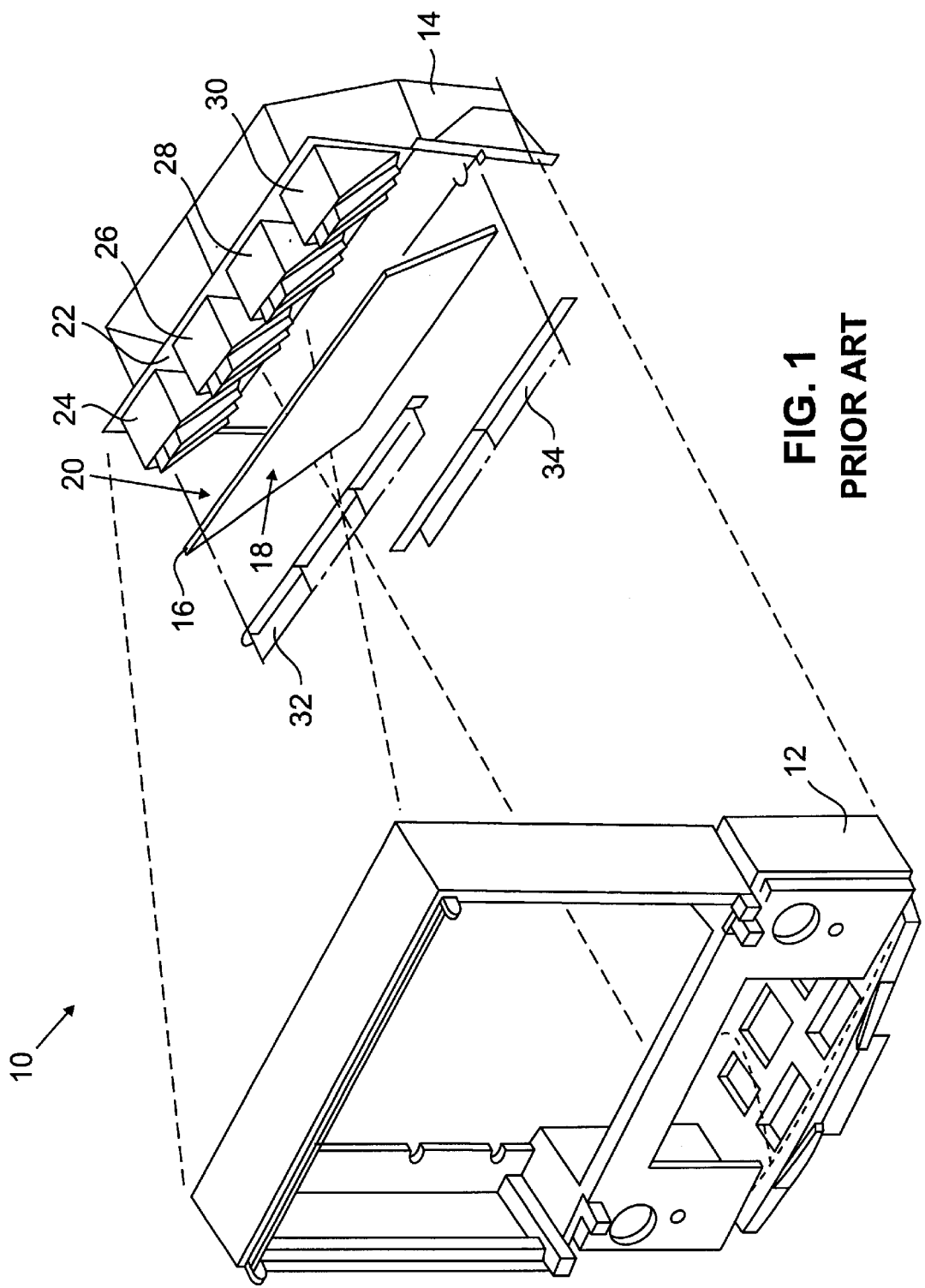
FIG. 1 is a view of a front portion and rear mirror cover for a conventional projection television.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in FIGS. 1–4.

Figure 2:
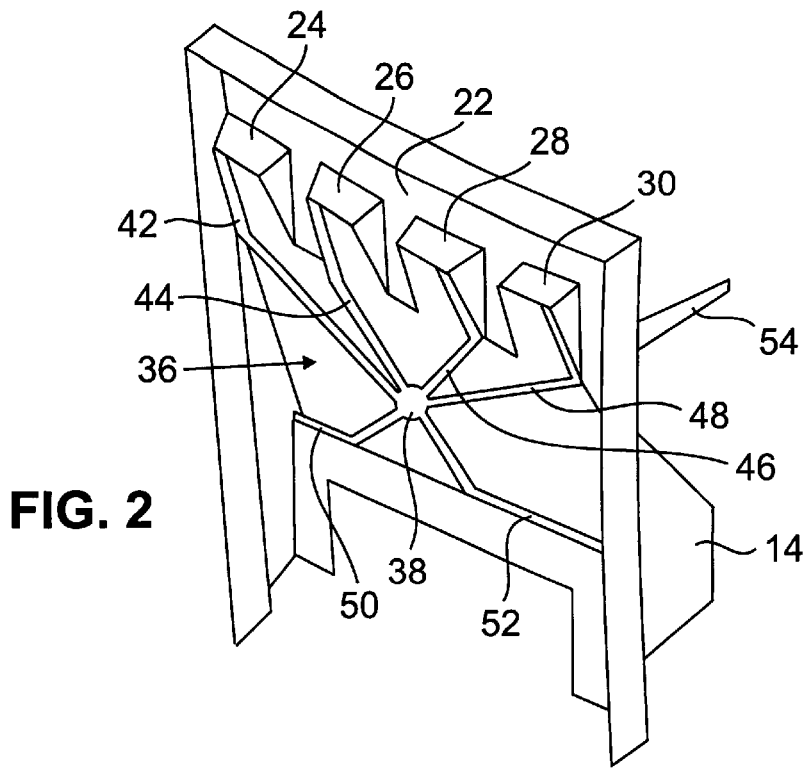
FIG. 2 is a perspective view of the interior of a mirror cover fabricated in accordance the present invention.
Figure 3:
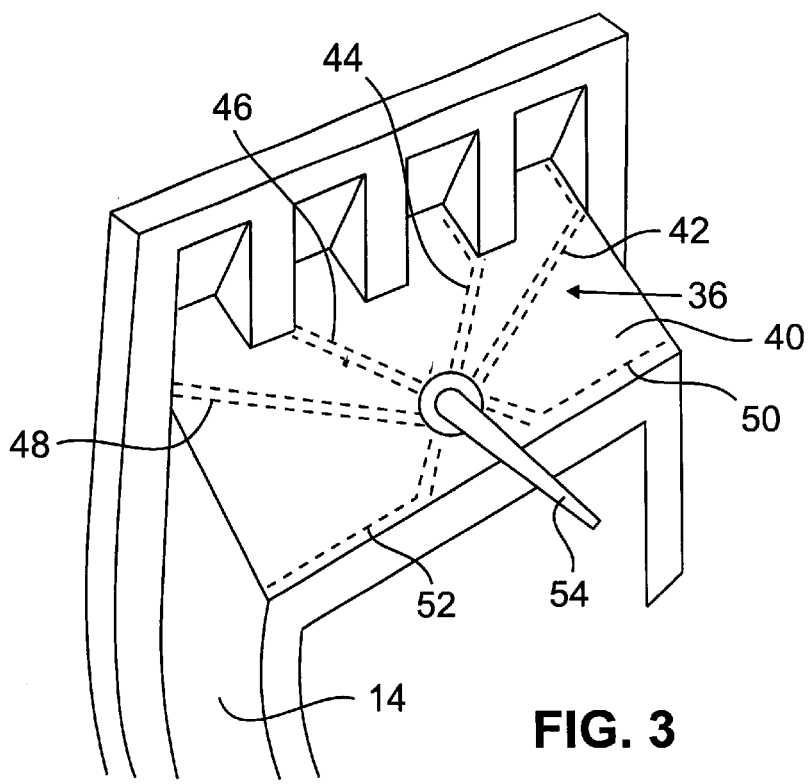
FIG. 3 is a perspective view of the exterior of the mirror cover shown in FIG. 2.

Referring to FIG. 2 in conjunction with FIG. 3, a runner apparatus 36 for the mirror cover 14 is shown. FIGS. 2 and 3 are perspective views of the interior and exterior of the mirror cover 14, respectively. The runner 36 includes a hub 38 having an interior cavity which is in fluid communication with an entrance aperture formed on a back surface 40 of the mirror cover 14. The runner 36 further includes first 42, second 44, third 46 and fourth 48 runner branches which extend from the hub 38 to the mounting areas 24,26,28,30, respectively. In addition, the runner 36 includes fifth 50 and sixth 52 runner branches which extend from the hub 38 to lower areas of the inner surface 22 (the runner branches 42,44,46,48, 50,52 are shown as dotted lines in FIG. 3). The runner branches 42,44,46,48,50,52 each include an internal passageway which is in fluid communication with the interior cavity. Further, each of the runner branches 42,44,46, 48,50,52 terminates in a gate from which melted plastic flows into a mold for forming the mirror cover 14. In use, a sprue 54 for receiving melted plastic during an injection molding process is connected in fluid communication with the interior cavity. In an alternate configuration, a gate may be located between the sprue 54 and the runner branches 42,44,46,48,50,52.

In accordance with the present invention, the runner branches 42,44,46,48,50,52 and hub 38 are molded as an integral structure with the mirror cover 14 such that runner branches 42,44,46,48,50,52, hub 38 and the mirror cover 14 form a one piece configuration. In one embodiment, the runner branches 42,44,46,48,50,52 and hub 38 are either fully or partially embedded within the inner surface 22. Alternatively, the runner branches 42,44,46,48,50,52 and hub 38 may be formed on top of the inner surface 22 and attached thereto. Fabrication of the runner branches 42,44, 46,48,50,52 and hub 38 as an integral part of the mirror cover 14 enables the fabrication of larger passageways than that provided by conventional runners. This enables an increase in the flow of melted plastic during the injection molding process, which substantially improves polymer homogeneity and thus increases the uniformity, consistency and quality of the mirror cover 14. Further, the present invention enables the molding of larger and/or non-symmetric parts without the need for a hot runner system or obtaining injection molding equipment capable of providing higher injection pressures and/or clamping forces. Moreover, it is noted that additional runner branches may be located adjacent the mounting areas or in other areas of the mirror cover 14 as desired along with additional sprues.

Figure 4:
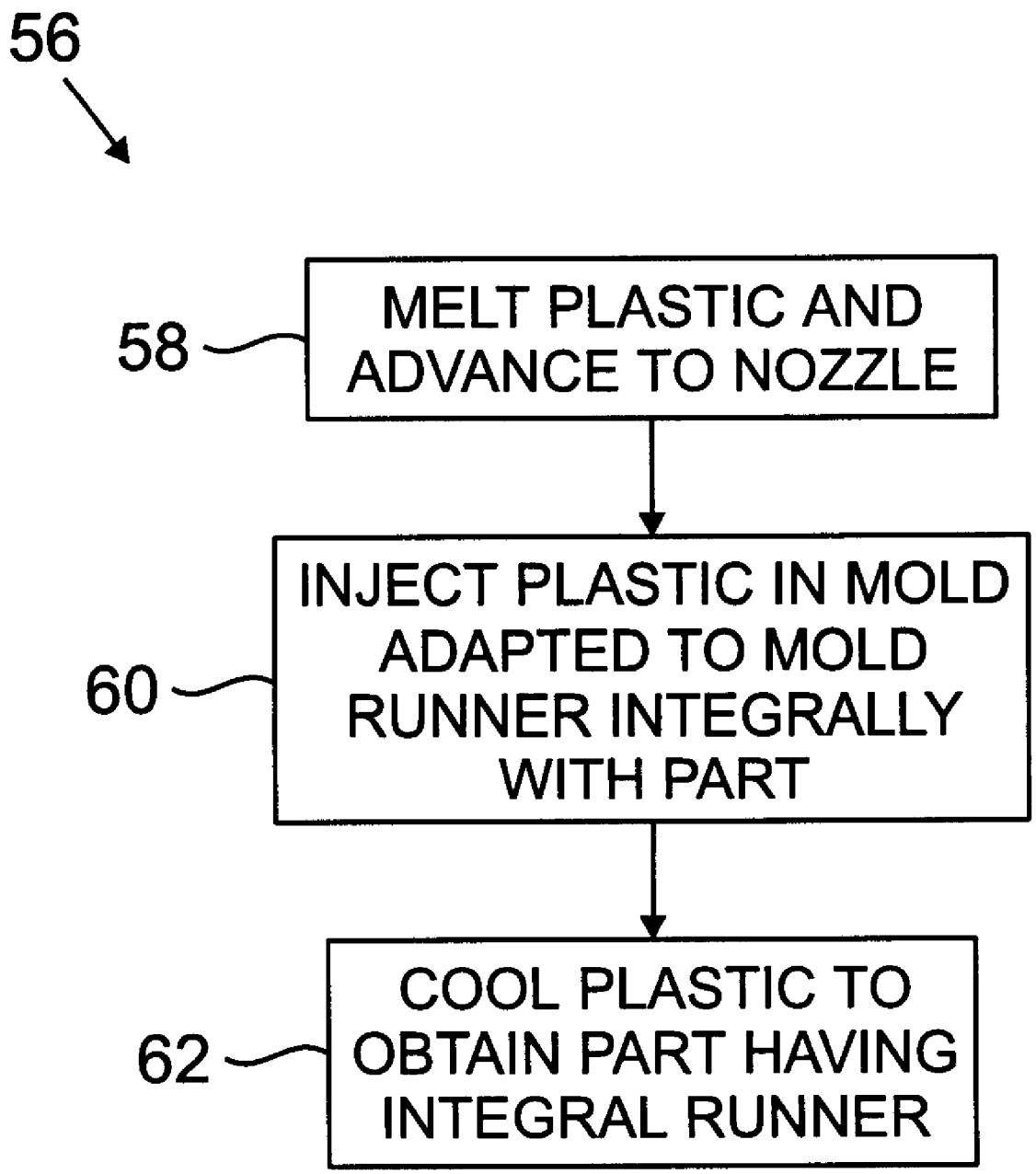
FIG. 4 depicts a process for forming an injection molded part in accordance with the present invention.

Referring to FIG. 4, an injection molding process 56 in accordance with the present invention is shown. It is understood that the process 56 may be used for forming any part which is injection molded and is not limited to the formation of mirror covers. In the first step 58, powder resin is melted within a heating chamber of an injection molding machine and then advanced to a nozzle. In the second step 60, the melted plastic is advanced into a mold which is adapted for forming a part having a runner apparatus integrally formed with the part. In the third step 62, the melted plastic is injected into the mold and allowed to cool to obtain a part having an integral runner which is thus non-removable. It is noted that the sprue may then be removed.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations are far within the scope of the appended claims.

What is claimed is:

1. A housing for a projection television, said housing being adapted to attach to a front portion of said projection television, said housing comprising:

a mirror cover having an inner surface, said inner surface including a plurality of blocks for supporting a mirror; and a runner integrally formed with said mirror cover,
wherein said runner has a plurality of branches, each of said branches having an internal passageway for receiving and distributing melted plastic for forming said integral mirror cover and runner.

2. The housing according to claim 1, wherein said plurality of runner branches extend from a hub element, wherein at least one of said runner branches is located adjacent each of said blocks, and wherein said runner branches and said blocks are formed on said inner surface.

3. The housing according to claim 2, wherein said hub element includes an aperture for receiving a sprue for an injection molding process.

4. A method of forming a part by injection molding, comprising the steps of:

providing injection molding equipment having a sprue for supplying melted plastic;

providing a mold for forming said part, said mold being used for forming a runner integrally with said part and said mold being connected to said sprue; and injecting melted plastic into said mold so as to form said part and said runner such that said runner is integrally formed with said part, wherein said runner has a plurality of branches, each branch having an internal passageway through which the melted plastic flows.

5. The method according to claim 4 wherein said part is a mirror cover for a projection television.

6. The method according to claim 5 wherein said mirror cover includes a plurality of mounting areas for supporting a mirror and said plurality of runner branches extend from a hub and wherein at least one of said runner branches is located adjacent each of said mounting areas.

\* \* \* \* \*